Figures 1, 11:
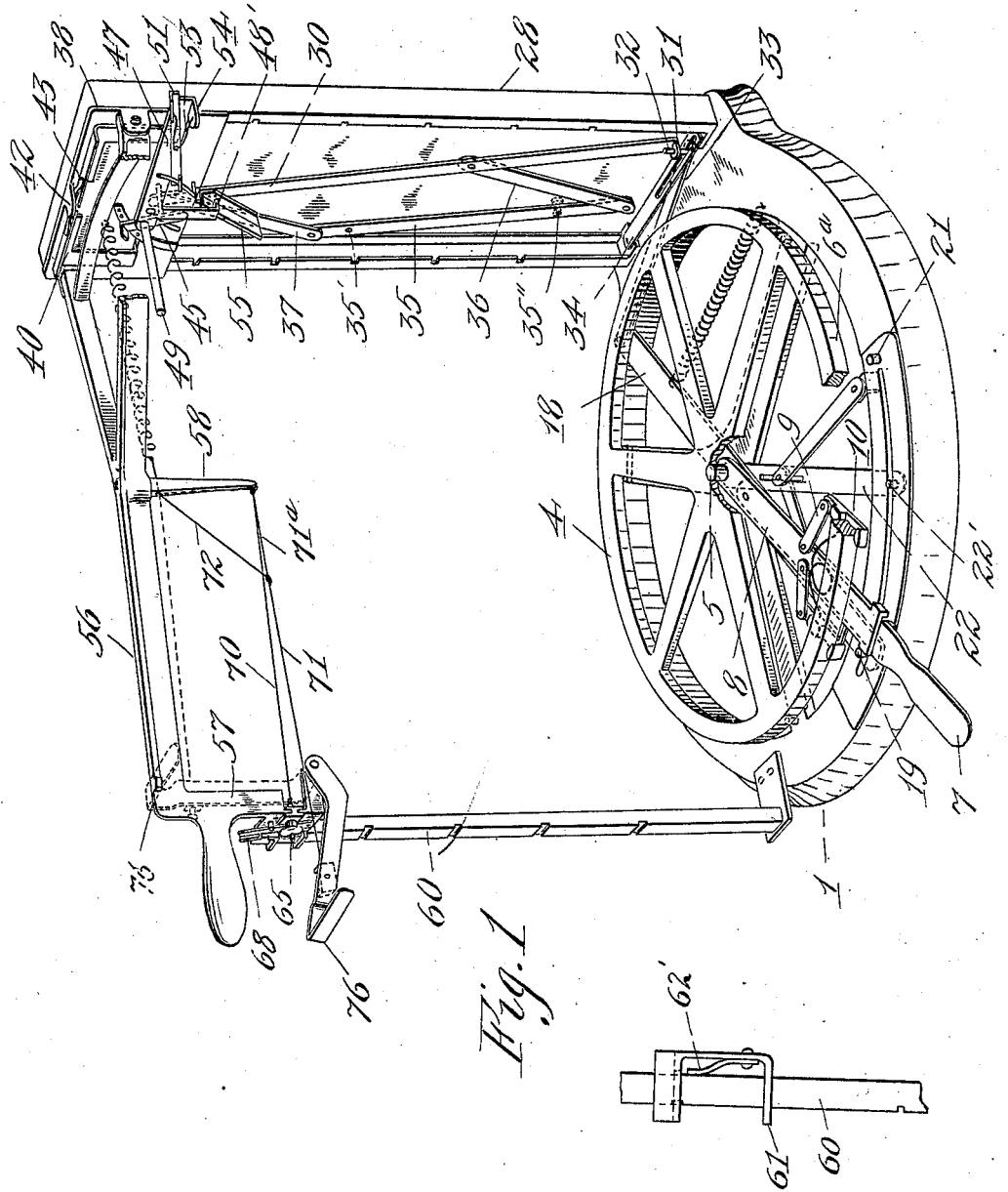

No. 828,508. PATENTED AUG. 14, 1906.
C. P. ROSS.
BUTTER CUTTER.
APPLICATION FILED FEB. 7, 1905.

3 SHEETS—SHEET 1.

Witnesses
Edward W. Cressman.
Arthur A. Brooks

Inventor
Charles P. Ross.
By Attorney
Frank E. Adams

No. 828,508. PATENTED AUG. 14, 1906.
C. P. ROSS.
BUTTER CUTTER.
APPLICATION FILED FEB. 7, 1905.
3 SHEETS—SHEET 2.
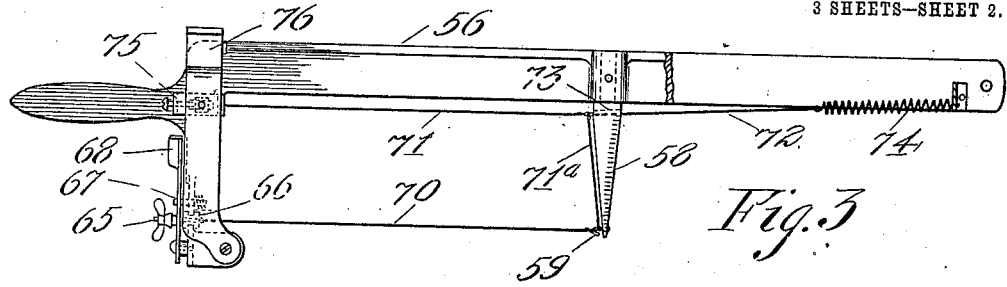
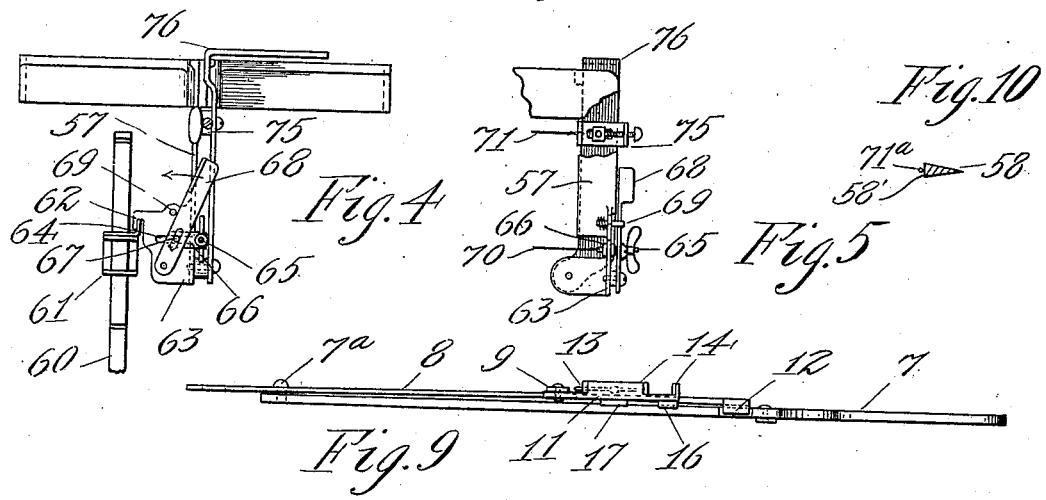
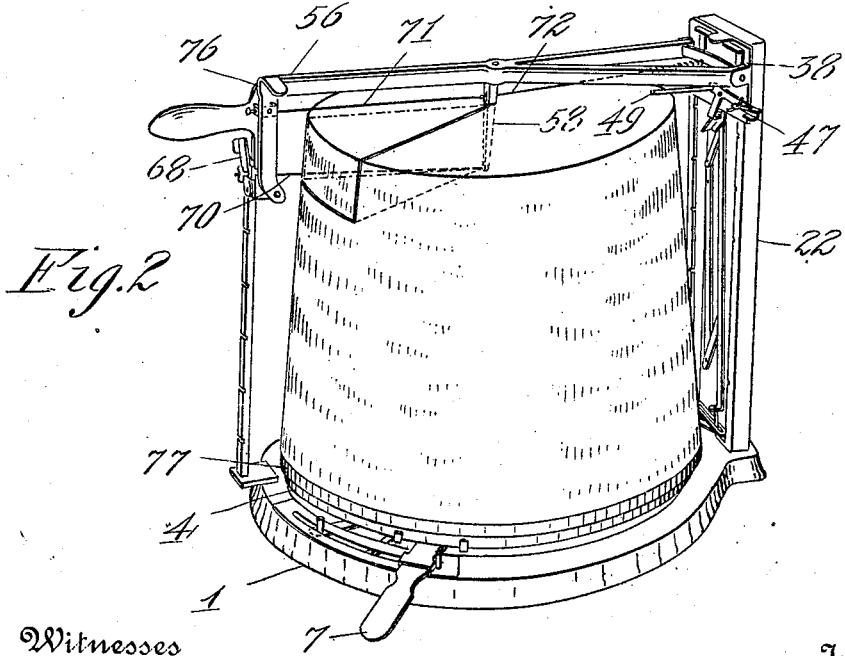
Witnesses
Edward W. Cressman.
Stephen H. Brooks,
Inventor
Charles P. Ross.
By his Attorney
Frank E. Adams
THE NORRIS PETERS CO., WASHINGTON, D. C.

No. 828,508. PATENTED AUG. 14, 1906.
C. P. ROSS.
BUTTER CUTTER.
APPLICATION FILED FEB. 7, 1905.
3 SHEETS—SHEET 3.
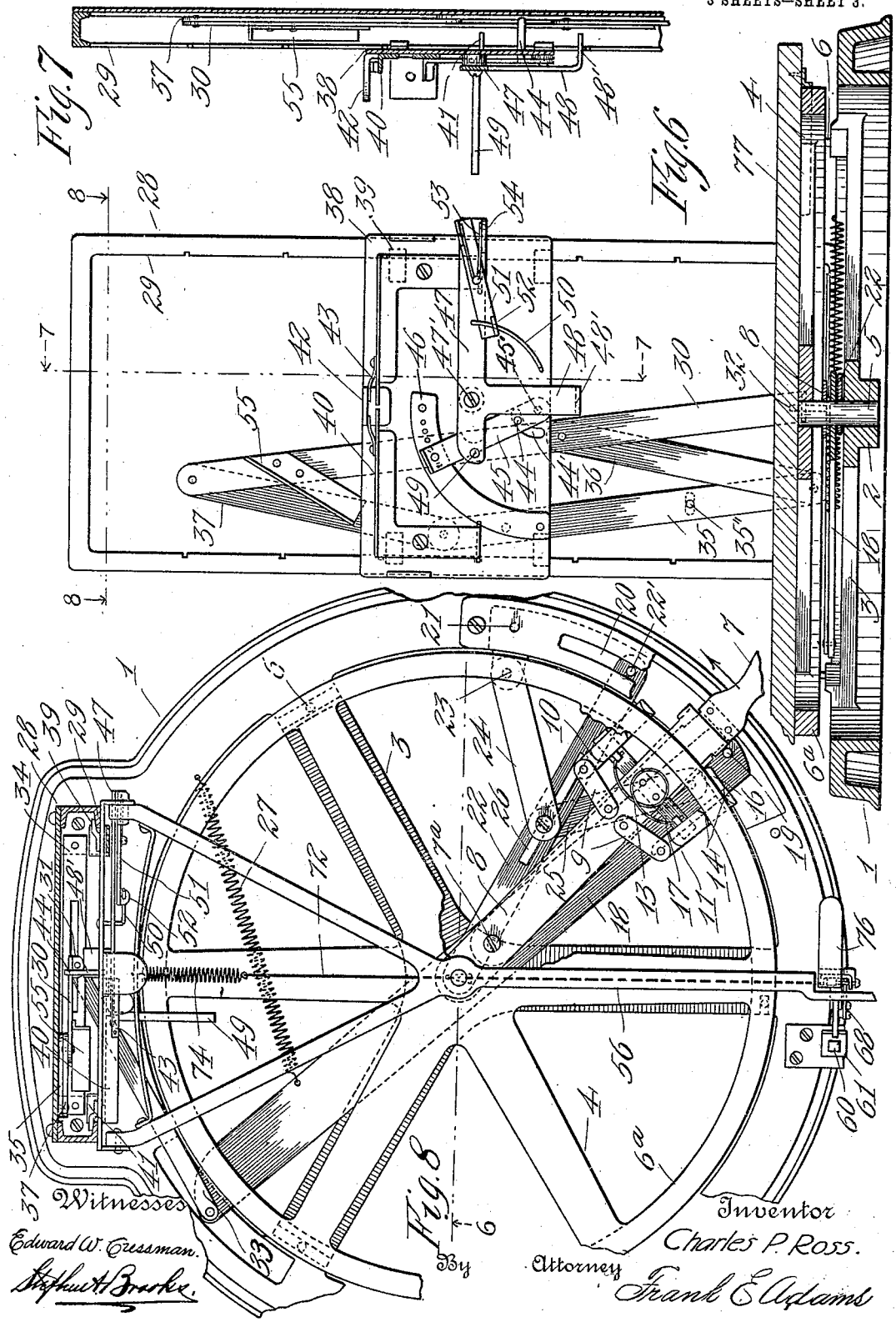
Witnesses
Edward W. Cussman.
Stephen H. Brooks.
Inventor
Charles P. Ross.
By Frank E. Adams
Attorney

UNITED STATES PATENT OFFICE.

CHARLES P. ROSS, OF SEATTLE, WASHINGTON.

BUTTER-CUTTER.

No. 828,508.         Specification of Letters Patent.         Patented Aug. 14, 1906.

Application filed February 7, 1905. Serial No. 244,636.

*To all whom it may concern:*

Be it known that I, CHARLES P. ROSS, a citizen of the United States of America, and a resident of the city of Seattle, in the county of King and State of Washington, have invented certain new and useful Improvements in Butter-Cutters, of which the following is a specification.

My invention relates to improvements in machines adapted to successively sever, by the production of vertical and horizontal slits, blocks from a body of butter, the same being an improvement upon my former application, Serial No. 209,577, and the primary object thereof is the production of an improved apparatus for cutting successively blocks of predetermined weight, from successive layers of which the body of butter is composed.

Further, the invention consists in providing an improved cutting means which is capable of cutting the vertical and horizontal slits in the body of the butter.

Further objects and advantages will be set forth in the following description, and those features upon which I desire protection defined in the appended claims.

In the accompanying drawings, forming a part of this specification and in which like numerals of reference indicate like parts throughout the several views, Figure 1 is a view in perspective of my improved machine, a portion of the rotary platform being broken away and the secondary cutter being shown in its lowered position. Fig. 2 is a similar view illustrating the same with a body of tub-butter resting on the platform having the first block partly severed from the top layer, the primary cutter having produced a vertical slit and a horizontal slit extending from the lower end thereof, and, further, illustrating the secondary cutter in a position to descend to cut the second vertical slit. Fig. 3 is a detail view, in side elevation, of the cutter-frame with the cutters in position thereon. Fig. 4 is an end elevation thereof and showing said cutter-frame secured to the notched upright of the base. Fig. 5 is a fragmentary detail view of the depending outer end bar of the cutter-frame, taken from the other side of the frame and showing the primary and secondary cutters connected thereto. Fig. 6 is a section taken on line 6 6 of Fig. 8 with the cutter-frame removed. Fig. 7 is a section taken on line 7 7 of Fig. 6. Fig. 8 is a sectional view taken on line 8 8 of Fig. 6, parts of the platform, base, and one of the clips of the carrier being broken away and the cutter and its support shown attached. Fig. 9 is a detail edge view of the clutch mechanism employed for rotating the platform. Fig. 10 is a cross-section view of the blade of the cutter-frame, and Fig. 11 is a detail view of the support carried by the notched upright.

My improved machine embodies a base 1, which is preferably of open form and is provided with a hub 2, secured to the inner ends of the radial spider-arms 3 of the base. Mounted above the base is a rotary platform 4, provided with a central hub, through which projects a journal-pin 5, having its lower portion fixed in the hub 2. In order to space the platform from the base, I rigidly mount on the spider-arms 3 studs 6, which engage the under face of the flange 6ª of the platform, which, as will be observed, is of substantially ring or annulus form.

7 indicates an operating-handle pivoted at 7ª to the under side of bar 8, pivoted on the pin 5 at a point beneath the platform, and to this bar 8 opposite links 9 are pivoted, these links having clutch-arms, as 10 and 11, pivoted to their outer ends. These clutch-arms are supported on a plate 17, secured to the under face of bar 8. The bar 8 at its outer portion is provided with opposite depending lugs 12, which extend on opposite sides of the handle 7. Consequently when the handle is swung one of its side edges will strike the adjacent lug 12, and thereby move bar 8 in unison therewith. The handle 7, however, is allowed slight play between lugs 12, so that it can be swung a short distance before it strikes a lug 12. The function of this construction will be set forth in the following: The clutch-arms are connected intermediate their ends to the free ends of a spring 13, which tends to draw the arms toward one another. These arms are each provided at their free portions with a pair of lugs 14, which extend on opposite sides of the portion 6ª of the platform and are held in gripping relation thereto by said spring 13. It will be understood that the lugs 14 of one clutch-arm grip the portion 6ª of the platform in a manner opposite to that of the lugs 14 of the other clutch-arm, (see Fig. 8,) so that the lugs of arm 10 cause the platform to move with bar 8 and handle 7, in one direction, as indicated by the arrow in Fig. 8, and the lugs of arm 11 prevent the platform moving of its own momentum when the limit of swing of handle 7 in said direction is reached. After the handle has been thus operated it is desirous that the handle and bar 8 should be returned to their normal positions without effecting a return movement of the platform, and as the lugs of arm 10 will ride freely over the portion 6ª in this direction, which is the reverse to that in which they operate, means merely has to be devised for releasing the lugs of arm 11. This I accomplish by providing clutch-arm 11 with a projecting lug 16, which is adapted to be struck by the handle 7 before said handle strikes the adjacent lug 12 of bar 8. Consequently the lugs of clutch-arm 11 are moved from their clutching position upon the portion 6ª of the platform before the bar 8 is moved by the handle 7, and they are held by the handle 7 in this position until the handle is again moved in the direction of the arrow, whereupon the spring 13 draws the clutch-arm 11 again into clutching relation with the portion 6ª of the platform.

18 indicates an indicator-arm fulcrumed on the pin 5 and having its opposite ends projecting beyond the edges of the platform, and at one end this arm is provided with a pin or indicator 19, which limits the throw of the bar 8 and handle 7 in one direction and which is movable with the arm in a segmental slot 20 in the base. Coacting with this movable indicator 19 is a stationary pin or indicator 21, which limits the throw of the handle 7 in the other direction. In connection with indicators 19 and 21 I provide an intermediate indicator-arm 22, which is swingingly mounted on pin 5, and like arm 18 carries an indicator 22'; but the indicator in this instance does not project above the upper face of the base, and thus when the handle 7 is swung it will move freely thereover.

23 is a fixed stud carried by the base, and 24 and 25 are links pivotally connected at their inner ends and having their pivot extended and riding in the slot 26 of the arm 22. The links 24 and 25 have their outer ends pivoted to the stud 23 and arm 18, respectively, by reason of which construction the links 24 and 25, being of equal length and one having a fixed pivot, as heretofore set forth, the intermediate arm will be moved one-half of the distance of the arm 18 and, as illustrated in the present case, will always retain its position central with respect to the indicators 19 and 21, respectively, and the edge of the handle 7 facing the indicator 19.

27 indicates a spring which has a tendency to return the indicator to its normal position, as shown in Fig. 1.

Secured to the base is a perpendicular hollow frame or box, as 28, open on its inner side and having inturned edge flanges 29, provided with spaced-apart notches, and within this frame I mount the primary set mechanism which controls the movement of the indicator-arms in such a manner that the indicator 19 is moved in the direction of the arrow. (See Fig. 8.) The primary set mechanism comprises a laterally-movable inclined bar 20, which at its lower end is formed with an apertured ear 31, in which the pin 32 of the link 33 is slidably received, and the other end of this link is pivoted to arm 18. This pin 32 is guided in a suitably-slotted guide-bar 34, secured to the base. An inclined adjustable bar 35, pivoted at 35' to the frame 28, is arranged adjacent bar 30 and is similarly inclined and has pivotally connected to its opposite ends links 36 and 37, which are also pivotally connected to bar 30 to movably support the same. This bar 35 is normally held against movement by a set-screw 35'', projecting into a suitable slot in the frame; but by moving the set-screw along its slot the inclination of bar 35 can be varied to adjust the inclination of bar 30. By reason of this construction, when pressure in a vertical plane is brought into engagement with bar 30, said bar will be given a slight lateral and upward movement, which movement will be transmitted to the indicator-arm 18 to adjust the indicator 19 relatively to indicator 21.

The bar 30 is adjusted to move the indicator 19 toward the indicator 21 by mechanism which embodies a carrier 38, extending across the open side of frame 28 and slidably held on the flanges thereof by clips 39.

40 indicates bell-crank levers pivoted to the carrier and having their lower ends bent inwardly to form tongues 41, which project through slots in the carrier and engage in the notches of the frame-flanges, whereby the carrier is securely held in its adjusted position. The upper ends of these levers lie adjacent one another, so that they can be simultaneously pressed upwardly toward a finger-piece 42 by one finger when it is desired to disengage the tongues 41 from their notches. The finger piece or grip 42, which is secured to the carrier can then also be grasped to adjust the carrier vertically. The levers 40 are then returned to their normal positions by springs 43.

44 indicates a set-pin which is adapted for engagement with one edge of the bar 30, whereby the latter is forced laterally, as heretofore set forth, and as I have found that it is often desirable that the movement of the bar should be varied to meet exigencies incident to the fact that the specific gravity of butter varies in different bodies I mount the set-pin on an arm 45, pivoted to a pin 45'. The set-pin projects through a segmental slot 44', and the arm 45 is provided with a tooth adapted to engage in the recesses of the segment 46. This construction permits of the lateral adjustment of the set-pin 44 during the setting operation.

It is well known that bodies of butter from the same size tub are oftentimes found to vary in height, and in order to meet this exigency I propose to remove the surplus height by combining the same in the top layer, thereby permitting the remaining poriton of the body of butter to be divided into layers of equal height or thickness. To do this, the height or thickness of the layer being ordinarily greater than that for which the set-pin 44 and inclined bar 30 are designed to set the variable indicator 19, whereby the external taper to the butter is compensated for, other means has to be devised which will act in conjunction with bar 30 for moving it laterally to a greater degree than would be the position thereof relatively to the set-pin when adjusted for compensating for the taper alone. Therefore I provide an auxiliary set mechanism embodying a lever 47, pivoted at 47' on the carrier 38 and formed with a downwardly-extending arm 48, having its lower portion bent inwardly to form a finger 48'. To the inner end of lever 47 a gage 49, comprising an outwardly-projecting arm, is secured.

Numeral 50 indicates a curved rod having its lower end pivoted in the carrier 38, and this rod is frictionally engaged by clutch-arm 51, pivoted on lever 47 and having at its inner end an outwardly-projecting apertured ear 52, through which the rod 50 projects. Thus when the outer end of clutch-arm 51 is depressed against the tension of spring 53 the ear will be moved from its angular clutching position relatively to rod 50, and the lever 47 can then be freely swung, so as to raise or lower the gage 49. Spring 53 (see Fig. 1) has its lower end resting on a fingergrip 54 of the lever 47, which is grasped simultaneously with the outer end of clutcharm 51, so as to depress the outer end of the clutch-arm when it is desired to adjust the same.

When it is desired to elevate the carrier 38, the clutch-arm is released from clutching engagement with rod 50 and the outer end of lever 47 swung downwardly, so as to elevate the gage 49, and thereby prevent it from contacting with the body of butter when it is placed on the platform. Thumb-piece 42 and the inner ends of levers 40 are then grasped, the latter being pressed upwardly to withdraw the tongues 41 from the notches of frame 28, and the carrier is then elevated. As the carrier is elevated the finger 48' engages the flange of inclined cam-plate 55, secured to bar 30, and thereby forces said bar laterally to move the indicator 19. After the carrier 38 is elevated and the body of butter set on the platform, the clutch-arm 51 is released from rod 50 and the outer end of lever 47 elevated until gage 49 rests on the top of the body of butter, which operation will permit of the spring 27 moving the indicator 19 relatively to the indicator 21 to indicate the movement of the handle 7 in order to compensate for the increased thickness of the blocks to be cut from the top layer.

56 is a cutter-frame having its rigid top cross-bar merging in diverging arms which are hinged to the carrier 38 for vertical swinging movement. At the opposite ends of this cross-bar are depending end bars 57 and 58, the latter of which constitutes a blade, the same having its sides tapered to provide a cutting edge along its inner portion, whereby the bar will produce a clean cut when swung with the frame into the butter. The outer side of bar or blade 58 is flattened, as at 58', (see Fig. 10,) and at the lower end thereof a hook 59 is secured.

60 indicates a notched upright secured to the base 1 at a point opposite the frame 28, and on this upright I mount a support 61, comprising clips which are secured together and loosely receive the upright 60 and one of which is forced into the notches of the upright by a spring 62', whereby the position of the support can be correspondingly altered when the cutter-frame and the carrier 38 are raised and lowered. This support 61 is provided with a keeper which is engaged by a hook 62, (see Fig. 4,) formed on the free edge of an extension-plate 63 of the outer depending end or bar of the cutter-frame, whereby the cutter-frame will be supported during horizontal cutting. This bar and plate are formed with a slot 64.

Mounted on the cutter-frame are what I term the "primary" and "secondary" cutters, both of which are shown as consisting of suitable lengths of wire. The primary cutter 70 is secured at one end to the hook 59 and its outer end is secured to a screw 65, provided with a thumb-nut seated on a slide 66, bearing on the frame extension-plate 63 and fitting the slot 64. A pin 67 is provided at the other end of this slide, which pin is received in the slot of the lever 68, pivoted to the extension-plate 63. By this construction the primary cutter can be shifted to one side of its normal position and held out of the path of the secondary cutter by suitable means, as the spring-pressed pin 69.

The secondary cutter is formed in two sections 71 and 71ª, the latter of which is pivoted on the hook 59 and normally lies in proximity to the flattened side portion of the blade 58 and has its upper end connected to section 71 and to a wire 72, which projects through an aperture 73 in the upper portion of blade 58 and is connected to a spring 74. Section 71 extends across to a tension device 75, pivotally secured to a lever 76, which is pivoted to the lower end of the outer framebar.

In operation, the carrier 38 being elevated, the body of butter which normally rests on disk 77 is lifted with said disk and placed on the rotary platform. The gage 49 is then lowered until it rests on the top of the body of butter and then the cutting operation commenced by swinging the cutter-frame downwardly until the hook 62 of the depending end bar of the cutter-frame engages the keeper of support 61, thereby making a vertical incision of predetermined depth in the body of butter. The platform is now rotated in the direction of the arrow in Fig. 8. The lever 68 is then swung in the direction of the arrow in Fig. 4 and held in such position by pin 69, so as to lie out of the path of the secondary cutter, which is then lowered by swinging lever 76 outwardly, as shown in Fig. 1, to make the second vertical incision or final cut in the body of butter, and thereby severing a block of segmental form therefrom. After the production of this final vertical cut the secondary cutter is returned to its normal position by the spring 74. The operation is then continued by again rotating the platform a predetermined distance, so that the primary cutter will produce the horizontal slit and then again lowering the secondary cutter, so that a vertical incision is again produced, whereby the second block is severed. This operation is continued until all of the blocks capable of being formed with the cutter cutting only to a certain depth are successively produced and in reality a layer of butter is removed from the top of the butter body. Then the carrier 38 is lowered until the tongues 41 of its retaining means engage in the next lower notches of the frame-flanges, and the support 61 is similarly lowered. Then a second layer of butter is passed through a similar dividing operation. Of course it is only necessary that the primary cutter 70 should be returned to normal position, so as to aline with the secondary cutter when it makes the first vertical incision in each layer of butter. After that, as heretofore stated, it is shifted to one side of the secondary cutter and held so, so that the horizontal slit cut thereby always extends a little past the point where the vertical slit formed by the secondary cutter intersects the same. As the carrier 38 is lowered and by reason of the tapered shape of the body of butter the weight of the blocks in the lower series would be greater than the preceding ones unless means was provided to make allowance for this external increase of material, and to obviate this difficulty I have devised the primary set mechanism heretofore referred to, which acts by reason of the set-pin 44, bearing on the edge of the inclined bar 30 and moving with said carrier in a straight vertical plane and forcing said bar laterally, so that the indicator 19 is moved by successive steps toward the fixed indicator 21, thereby decreasing the space therebetween, and consequently limiting the movement of handle 7. As the movement of the handle 7 is restricted more upon each lowering operation of the carrier 38, the gradual increase of the length of the blocks is thus compensated for. In the foregoing I have described merely the operation of the handle as being moved to the limit of its movement upon each operation thereof. This, however, is not absolutely necessary, as smaller-sized blocks can be produced by moving the handle 7 but a portion of its path of travel and then operating the secondary cutter, as stated, and as the intermediate indicator always indicates the central point in the path of travel between the movable and fixed indicators 19 and 21, respectively, the apparent weight of such various sizes of blocks can be readily determined by mental calculation. For dividing the bottom layer of the body of butter it is merely necessary to form vertical slits which extend through the bottom of the layer. These I produce by employing the primary cutter 70 alone, the same being raised and lowered by swinging the cutter-frame, as is obvious. After the entire body of butter has been divided the carrier 38 is elevated to permit of a new body of butter being placed on the platform, and the cutting operation is then repeated as before.

Having thus described my invention, what I claim as new, and desire to secure by Letters Patent of the United States of America, is—

1. In a machine for cutting butter, means for supporting a body of butter for movement, a cutter movable into the butter, means for supporting said cutter when in the butter against movement therewith, and a second cutter movable into the butter for cutting to a point in alinement with the first-named cutter.

2. In a machine for cutting butter, a movable platform for supporting the butter to be cut, means movable toward the platform at an angle thereto for making a cut in the butter, means for holding said means when in the butter against movement in the direction of movement of the platform, means for moving the platform to advance the butter whereby said first means makes a second cut extending at an angle to the first cut, and means independent of said first means for making a cut which intersects the last-named cut.

3. In a machine for cutting butter, a movable platform for supporting the butter to be cut, a plurality of cutters movable successively into the butter at an angle to the platform, means for holding one of said cutters stationary when it is in the butter, and means for moving said platform to advance the butter when the last-named cutter is held stationary.

4. In a machine for cutting butter, a platform for supporting the butter to be cut, said platform being movable in a horizontal plane, a cutter, means for lowering the cutter into the butter thereby forming a vertical cut, means for holding the cutter stationary when it is in lowered position, means for moving the platform to advance the butter when the cutter is in lowered position, and means independent of said cutter for making vertical cuts in the butter.

5. In a machine for cutting butter, in combination with a movable platform, a cutter-frame arranged above the platform and being movable to and from the same, and a plurality of spaced-apart cutters on said frame, one of said cutters being movable independently of the frame for cutting.

6. In a machine for cutting butter, in combination with a rotary platform, an open cutter-frame supported for swinging movement above the platform and having its inner end normally in alinement with the axis of said platform, a cutter extending across the lower portion of said frame, and a second cutter mounted on said frame and being movable vertically independently thereof.

7. In a machine for cutting butter, in combination with a rotary platform, and open cutter-frame movable to and from the platform and having its inner end normally in alinement with the axis of said platform, a cutter extending across the lower portion of said frame, and a second cutter supported on said cutter-frame and being movable to and from the platform independently of said frame.

8. In a machine for cutting butter, a cutter-frame movable in a vertical plane, a cutter secured to the frame, and a second cutter supported on the frame above the first-named cutter and having a movement independent of the frame.

9. In a machine for cutting butter, a vertically-movable open cutter-frame, spaced-apart cutters extending thereacross, one of said cutters being adapted for vertical and horizontal cutting, and means for moving the other cutter independently of the frame, in combination with means arranged below said frame for moving the butter to be cut.

10. In a machine for cutting butter, a cutter-frame, a cutter supported thereon for vertical and horizontal cutting, and a second cutter supported on said cutter-frame and being movable to produce a vertical cut.

11. In a machine for cutting butter, an open cutter-frame, a cutter extending across said cutter-frame and a second cutter supported on said frame to one side of said first cutter and being movable for cutting to a point in line with the first-named cutter.

12. In a machine for cutting butter, a cutting means comprising an open cutting-frame, a cutter extending across the lower portion thereof, and a cutter arranged above the first-named cutter and being movable for cutting to said first cutter.

13. In a machine for cutting butter, a frame, a cutter supported thereon and being composed of separate sections flexibly connected and being movable across the frame.

14. In a machine for cutting butter, a frame, a cutter swingingly connected to the frame, said cutter being formed of sections normally arranged at an angle to each other and flexibly connected together at their adjacent ends, and resilient means for holding said sections in their normal positions.

15. In a machine for cutting butter, a frame, and a cutter swingingly connected to the frame, said cutter comprising a plurality of sections swingingly connected at their adjacent ends.

16. In a machine for cutting butter, a frame, a cutter swingingly connected to the frame, said cutter comprising a plurality of sections arranged at an angle to each other and swingingly connected at their adjacent ends, and a resilient means connected to the adjacent ends of said sections.

17. In a machine for cutting butter, a cutting means comprising a plurality of cutter-sections arranged at an angle to each other and means for moving the cutter-sections relatively to each other for cutting in a common plane.

18. In a machine for cutting butter, a cutter comprising a plurality of sections flexibly connected and normally extending at an angle to one another, means for moving the sections for cutting in a common plane, and means for returning the sections to their normal positions.

19. In a machine for cutting butter, a cutter comprising a plurality of sections flexibly connected and normally extending at an angle to one another, a supporting means to which one end of the cutter is secured, means connected to the other end of the cutter for imparting movement thereto, and means for returning the cutter to its normal position.

20. In a machine for cutting butter, a swingingly-mounted cutter-frame provided with a depending blade, and a cutter on said frame disposed at one side of the blade and being movable longitudinally thereof.

21. In a machine for cutting butter, a cutting means comprising a frame, a plurality of independently-movable cutters supported thereon, and means to move said cutters at an angle to one another.

22. In a machine for cutting butter, in combination with a supporting means, a cutter-frame supported thereon for movement, and a pair of cutters mounted on said frame for movement independent thereof, one of said cutters being movable independently of the frame in the direction of travel of the frame, and at an angle to the direction of movement of the other cutter.

23. In a machine for cutting butter, a cutting means comprising a frame, and a pair of cutters mounted on the frame one above the other for movement, the upper cutter being movable toward the lower cutter, and means to shift the lower cutter at an angle to the direction of movement of the upper cutter.

24. In a machine for cutting butter, a cutting means consisting of an open frame composed of a cross-bar and end bars, a cutter extending across the frame and connected to said end bars, and a sectional cutter having its sections swingingly connected at their adjacent ends, one section of said cutter being swingingly connected to one of said end bars and being resiliently held to normally extend at an angle to the first cutter.

25. In a machine for cutting butter, a cutting means comprising an open frame, a cutter supported on the frame and extending thereacross, and a sectional cutter extending across the frame on one side of said first cutter, the adjacent ends of its sections being swingingly connected, and one section of said cutter extending toward the first cutter and being swingingly supported.

26. In a machine for cutting butter, a cutting means comprising a frame, a cutter swingingly connected to the frame, said cutter having flexibly-connected sections normally extending at an angle to each other, a means engaging said sections at the point of angle for retracting them after each swinging movement, and means for swinging said cutter.

27. In a machine for cutting butter, a cutting means comprising a frame, a cutter swingingly connected to the frame, said cutter having its sections flexibly connected and normally extending at an angle to each other, a means pivoted to the frame and connected to said cutter for operating the same, and a retracting means connected to said sections at their adjacent ends.

28. In a machine for cutting butter, a frame comprising a cross-bar and depending end bars, one of said end bars constituting a blade, a cutter extending across the frame and being secured to the respective end bars, and a second cutter supported on the frame and being movable independently thereof.

29. In a machine for cutting butter, a frame having end bars, a cutter extending across the frame and being swingingly connected to one end bar and means connected to the other end bar and to said cutter for swinging the same.

30. In a machine for cutting butter, a frame having depending end bars, a cutter having one of its ends swingingly connected to one end bar, a shiftable means mounted on the other bar, said cutter having its other end connected to said means, and means for holding said shiftable means in its adjusted position.

31. In a machine for cutting butter, in combination with a movable means for supporting the butter to be cut, a cutter-frame movable to and from said movable means, a cutter on said frame for cutting during movement of the frame, and means for moving the cutter independently of the frame for cutting.

32. In a machine for cutting butter, in combination with a movable means for supporting the butter to be cut, a cutter-frame movable to and from said movable means, a cutter supported on the frame and being movable laterally thereof, means to hold the cutter from movement, and a second cutter arranged on said frame and being movable to and from the said movable means independently of the frame.

33. In a machine for cutting butter, in combination with a movable platform, and means for indicating the movement thereof, a movable carrier, a cutter movable with the carrier, a set mechanism acting in conjunction with the carrier as adjusted for varying the set of the indicating means, means for controlling said set mechanism from the carrier, and a set mechanism on said carrier coacting with means on said first set mechanism for separately adjusting the position of said first set mechanism when the carrier is in a predetermined position.

34. In a machine for cutting butter, in combination with a movable platform, and means for indicating the movement thereof, a movable carrier, a cutter movable with the carrier, a set mechanism acting in conjunction with the carrier as adjusted for varying the set of the indicating means, means for controlling said set mechanism from the carrier, a lever fulcrumed on said carrier, a means secured to said lever, and means carried by the set mechanism for engagement with said last means to separately adjust the position of said set mechanism when the carrier is in a predetermined position.

35. In a machine for cutting butter, in combination with a movable platform, and means for indicating the movement thereof, a movable carrier, a cutter movable with the carrier, a set mechanism acting in conjunction with the carrier as adjusted for varying the set of the indicating means, means for controlling said set mechanism from the carrier, a lever fulcrumed on said carrier, a gage to which the lever is adapted to be rigidly secured, and means operated by said lever coacting with means carried by said set mechanism for separately adjusting the position of said set mechanism when the carrier is in a predetermined position.

36. In a machine for cutting butter, in combination, a movable platform, means for moving the same, an indicator for indicating the throw of said means, a carrier movable to and from the platform, a cutter movable with the carrier, an inclined bar movable transversely of the path of the carrier for actuating the indicator, a reversely-inclined cam-track secured to said bar, means for moving said bar from the carrier, and means on the carrier independent of said last means for engagement with said cam-track.

37. In a machine for cutting butter, in combination, a movable platform, means for moving the same, an indicator for indicating the throw of said means, a carrier movable to and from the platform, a cutter movable with the carrier, an inclined bar movable transversely of the path of the carrier for actuating the indicator, a cam-track secured to said bar, means mounted on the carrier for engagement with said bar for shifting the same, and swingingly-mounted means on the carrier independent of said last means for engagement with said cam-track for adjusting the position of said bar when the cutter is in a predetermined position.

38. In a machine for cutting butter, in combination, a movable platform, means for moving the same, an indicator for indicating the throw of said means, a carrier movable to and from the platform, a cutter movable with the carrier, an inclined bar movable transversely of the path of the carrier for actuating the indicator, a cam-track secured to said bar, means mounted on the carrier for engagement with said bar for shifting the same, a lever pivoted to said carrier, an arm secured to said lever and having an inwardly-projecting lip for engagement with said cam-track, and means for holding said lever against movement.

39. In a machine for cutting butter, a set mechanism, a movable carrier, a cutter mounted on the carrier, and independent means for controlling said set mechanism from the carrier, in combination with a movable platform, means for moving the same, and an indicating means acting in conjunction with said last means and being operated by said set mechanism.

40. In a machine for cutting butter, in combination with a rotatable platform provided with an annular flange, a bar pivoted concentrically to the platform, oppositely-projecting links pivoted to the bar, clutch-arms pivoted to said links, said clutch-arms having gripping portions arranged on opposite faces of said flange, means to swing said clutch-arms toward one another, a handle connected to said bar for swinging the same, and means operated by said handle for swinging one clutch-arm away from the other.

41. In a machine for cutting butter, in combination with a rotatable platform provided with an annular flange, a bar pivoted concentrically to the platform, a pair of clutch-arms pivotally connected to said bar and having clutching engagement with said flange, one of said clutch-arms having a reverse clutching action on said flange to that of the other, means connected to said bar for swinging the same, and means whereby one of said clutch-arms is disengaged from said flange.

42. In a machine for cutting butter, in combination with a rotatable platform provided with an annular flange, a bar pivoted concentrically to the platform and being provided with spaced-apart lugs, a handle pivoted to said bar and having limited movement between the lugs thereof, a pair of clutch-arms pivotally connected to said bar and having reverse clutching actions upon said flange, means tending to normally swing said arms toward one another, and means whereby one of said clutch-arms is moved away from the other during independent movement of the handle.

Signed at Seattle, Washington, this 28th day of January, 1905.

CHARLES P. ROSS.

Witnesses:
  E. W. BRONSON,
  IRA BRONSON.